(12) United States Patent
Clark

(10) Patent No.: US 6,530,771 B1
(45) Date of Patent: Mar. 11, 2003

(54) ROTARY CUTTER HANDLING SYSTEM

(75) Inventor: Donald B. Clark, Mission Viejo, CA (US)

(73) Assignee: Casa Herrera, Inc., Pomona, CA (US)

( * ) Notice: Subject to any disclaimer, the term of this patent is extended or adjusted under 35 U.S.C. 154(b) by 0 days.

(21) Appl. No.: 08/818,642

(22) Filed: Mar. 14, 1997

(51) Int. Cl.$^7$ .............................. A21C 3/10; A21C 5/00
(52) U.S. Cl. ...................... 425/194; 425/298; 425/308; 83/346; 83/563; 83/564; 83/662; 83/698.41; 83/932; 426/503
(58) Field of Search .......................... 83/563, 564, 346, 83/932, 318, 662, 699.61, 347, 673; 425/223, 298, 308, 363; 426/502, 503, 517, 518; 101/216

(56) References Cited

U.S. PATENT DOCUMENTS

| | | | | |
|---|---|---|---|---|
| RE16,384 E | * | 7/1926 | McCrohan et al. | ........ 83/346 X |
| 2,991,735 A | * | 7/1961 | Womer | ..................... 83/155 X |
| 4,405,298 A | * | 9/1983 | Blain | ......................... 428/308 |
| 5,180,593 A | * | 1/1993 | Mistretta et al. | ........ 428/363 X |
| 5,498,148 A | * | 3/1996 | Ouellette et al. | ....... 425/363 X |
| 5,498,433 A | * | 3/1996 | Ouellette | ................ 425/363 X |
| 5,571,549 A | * | 11/1996 | Ouellette et al. | ....... 426/502 X |
| 5,580,583 A | * | 12/1996 | Caridis et al. | .......... 425/363 X |
| 5,626,898 A | * | 5/1997 | Caridis et al. | .............. 426/502 |
| 5,666,881 A | * | 9/1997 | Zanoli | ..................... 101/216 X |
| 5,720,990 A | * | 2/1998 | Lawrence et al. | ....... 425/363 X |
| 5,811,137 A | * | 9/1998 | Clark et al. | ................. 425/194 |

* cited by examiner

Primary Examiner—Clark F. Dexter
(74) Attorney, Agent, or Firm—Myers, Dawes & Andras LLP

(57) ABSTRACT

A cutter carriage for moving a rotary cutter between a front side of the back roller and a back side of the back roller. The preferred system has a pair of guide rods located on the left and right side plates of the sheeting head. The rotary cutter is held at either end by pivot arms. Each arm, in turn is attached to a carriage side piece that slidingly engages one of the guide rods. The two side pieces are joined into a single cutter carriage by an elongate member parallel to the rotary cutter. Each carriage is equipped with a cutter engagement system that moves the pivot arms and attached rotary cutter into an operational position in relation to the sheeting head. When the rotary cutter is serviced, the engagement system is released allowing the pivot arm to move the rotary cutter away from the sheeting head roller, and the cutter carriage is slid along the guide rods making the rotary cutter readily accessible from the rear side of the sheeting head.

15 Claims, 8 Drawing Sheets

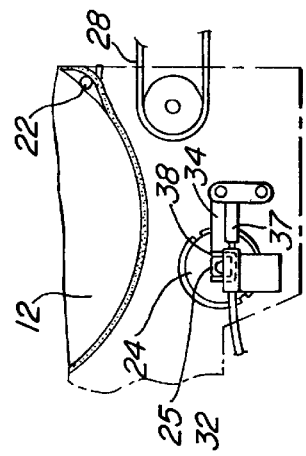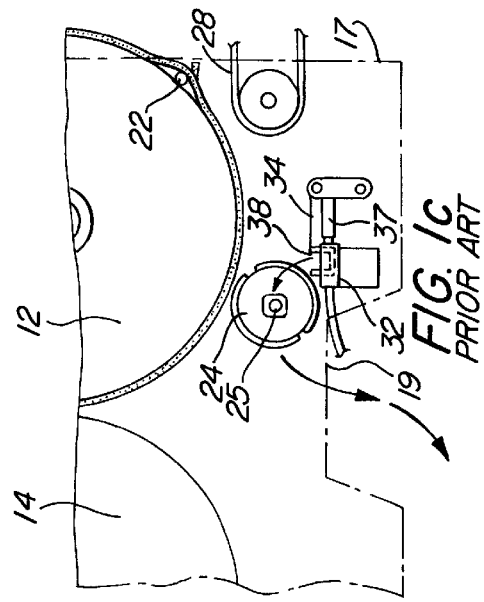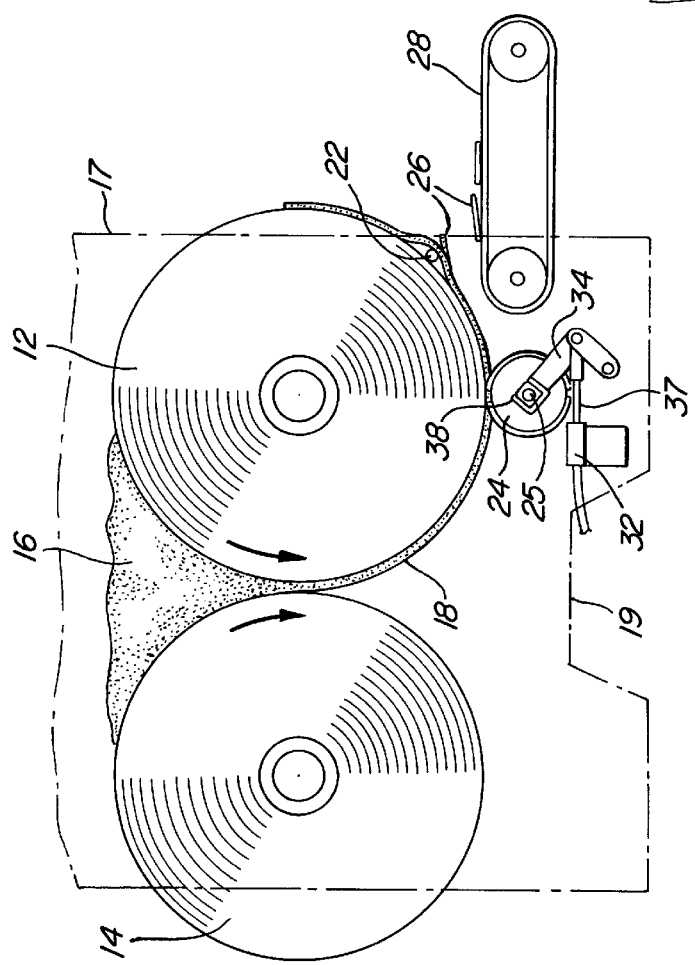

ROTARY CUTTER HANDLING SYSTEM

BACKGROUND OF THE INVENTION

1. Field of the Invention

The present invention relates generally to machinery for processing foods and, more particularly, to a sheeting head or "sheeter" for processing dough into relatively thin sheets out of which corn tortillas, tortilla chips, sheeted corn chips, sheeted potato chips, and similar food products are cut and to an improved system for handing the rotary cutter which cuts the dough sheet.

2. Description of Related Art

Maize (corn) is the chief cereal grain of the Americas, but dried maize cannot be readily steamed into a palatable staple like rice. Consequently, the native American peoples developed a technique in which they cooked dried maize with calcium carbonate or other alkali and then ground the resulting cooked kernels to produce a sticky dough known as masa.

Traditionally masa dough was shaped by hand and baked on a stone griddle to make tortillas. The popularity of tortillas and other comestibles made from masa has continued to increase. Today special machines called sheeting heads form the masa into relatively thin sheets from which tortillas and other food products such as chips or tortillas are cut. As shown in cross-section in FIG. 1a, a typical sheeting head comprises a pair of parallel counterrotating rollers, a front-roller 12 and a rear roller 14, rotating on horizontal axes between a spaced pair of side plates 17. Masa dough 16 is loaded into the sheeting head, where it is drawn between the rollers and formed into a thin sheet 18 in a pinch point or extrusion zone.

The dough is sticky and tends to cling to both rollers. However, differential roller motion or a physical stripping device like a wire or a "doctor blade" transfers the dough sheet to the front roller 12. As the rollers rotate, the sheet of dough is carried away from the extrusion zone by the front roller 12.

A rotary cutter, 24 sometimes called a cutter roller, counterrotates on a shaft 25 and is in contact with the front roller 12. The surface of the rotary cutter 24 bears a series of raised ridges that define the shapes of the tortillas, chips, or other products to be cut from the masa dough sheet 18. When the rotary cutter 24 rotates into contact with the dough sheet 18, carried by the front roller 12, the ridges cut the dough sheet 18 into pieces 26. The cut dough pieces 26 still stick to the front roller 12, but as the cut dough pieces 26 are moved along by the rotation of the front roller 12, they come into contact with a stripper wire 22 which scrapes the dough pieces from the front roller 12.

The dough pieces 26 fall onto a moving conveyor belt 28 which carries them into an oven or fryer for final cooking. In some sheeting heads an ingenious system of grooves and bands on the front roller retains edge remnants of the dough sheet on the roller. Thus, only the desired cut dough pieces 26 are removed by the stripper wire 22. The front roller 12 carries the dough remnants or "rework" back into the top of the sheeting head to be added back in to the main mass of dough for recycling.

The rotary cutter 24 requires rather frequent attention. It is not unusual to replace the rotary cutter 24 during a shift either because chips or tortillas of a different size or shape are desired or because the rotary cutter 24 has become worn or damaged.

Some sheeters include a mechanism that alternately engages or disengages the rotary cutter 24 from interaction with the dough sheet 18. FIGS. 1a to 1c, for example, show an air cylinder 32 including a piston 37 attached to a pivoting lever arm 34 which terminates in a yoke 38 that carries the rotary cutter 24. When the cylinder 32 is energized as in FIG. 1a, the lever arm 34 pivots upward to bring the rotary cutter 24 into contact with the dough sheet 18. When the cylinder 32 is not energized as in FIG. 1b, the weight of the rotary cutter 24 causes the lever arm 34 and the attached rotary cutter 24 to swing away from the dough sheet 18. An advantage of this arrangement is that whenever the sheeting head power is turned off, the rotary cutter 24 is automatically moved out of contact with the dough sheet 18 into a removal position where the rotary cutter can be removed from the lever arm 34.

Nonetheless, severe removal problems still exist because, as shown in FIGS. 1a–1c, the rotary cutter 24 is inaccessibly located between the side plates 17 and beneath the front roller 12, making it difficult to reach the cutter from the back of the sheeting head or from the side. The conveyor belt 28 and other mechanisms generally make it impossible to access the rotary cutter from the front side as well. Accordingly, the side plates 17 in a conventional sheeting head are provided with access ports or lower cut outs 19, as shown, so that the rotary cutter 24 can be inserted and removed from the side.

The rotary cutter 24 is typically removed through the access port 19, as shown in FIG. 1C, by laboriously lifting it out of the yokes 38 of the pivoting lever arms 34 and then carefully guiding it through the access port 19 in one of the side plates 17. Cutter replacement is accomplished by reversing this process. In either case, it is troublesome, time-consuming, and may result in injury to the operator or damage to the rotary cutter.

There remains a considerable need, therefore, for a system that makes cutter replacement simple and avoids the need to work through the side plates and under the rollers of the sheeting head to service or replace the rotary cutter.

SUMMARY OF THE INVENTION

It is an objective of the present invention to provide a simple system to improve the ease of cutter replacement; and It is a further objective of the present invention to permit simple cutter replacement from the rear of the sheeting head without having to reach under the rollers and then guide the rotary cutter laterally through a side plate.

These and other objectives are met by a cutter replacement system that consists of a pair of guide rods located on the inner surfaces of the left and right hand side plates of the sheeting head. These rods are parallel and are oriented horizontally at right angles to the longitudinal axes of the rollers. The rotary cutter is held at either end by a cutter carriage that slidingly engages the guide rods. The cutter carriage is preferably equipped with a rotary cutter engagement system that moves a pivot arm and attached rotary cutter into an operational position in relation to the sheeting head. When the rotary cutter is to be serviced or replaced, the engagement system is released allowing the pivot arm to move the rotary cutter away from the front sheeting head roller, and cutter carriage holding the rotary cutter is slid rearward along the guide rods under the back roller so that it is readily accessible from a back side of the sheeting head.

BRIEF DESCRIPTION OF THE DRAWINGS

The objectives and features of the present invention, which are believed to be novel, are set forth with particularity in the appended claims. The present invention, both as to its organization and manner of operation, together with further objectives and advantages, may best be understood by reference to the following description, taken in connection with the accompanying drawings.

FIG. 1a shows a diagrammatic cross-section of a prior art sheeting head where a rotary cutter pivots on lever arms fixed to the side plates of the sheeting head;

FIG. 1b shows a close up diagrammatic cross-section of the prior art sheeting head of FIG. 1a to illustrate the rotary cutter in a lowered position;

FIG. 1c shows the prior art rotary cutter of FIG. 1b being removed from the sheeting head through an access port in the side plate;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a rotary cutter handling system 10 for a sheeting head, wherein the rotary cutter is operationally mounted on a carriage which slidingly moves the rotary cutter between an operating position for sheeting dough and an accessible position for ease of replacement.

Figure 2A:
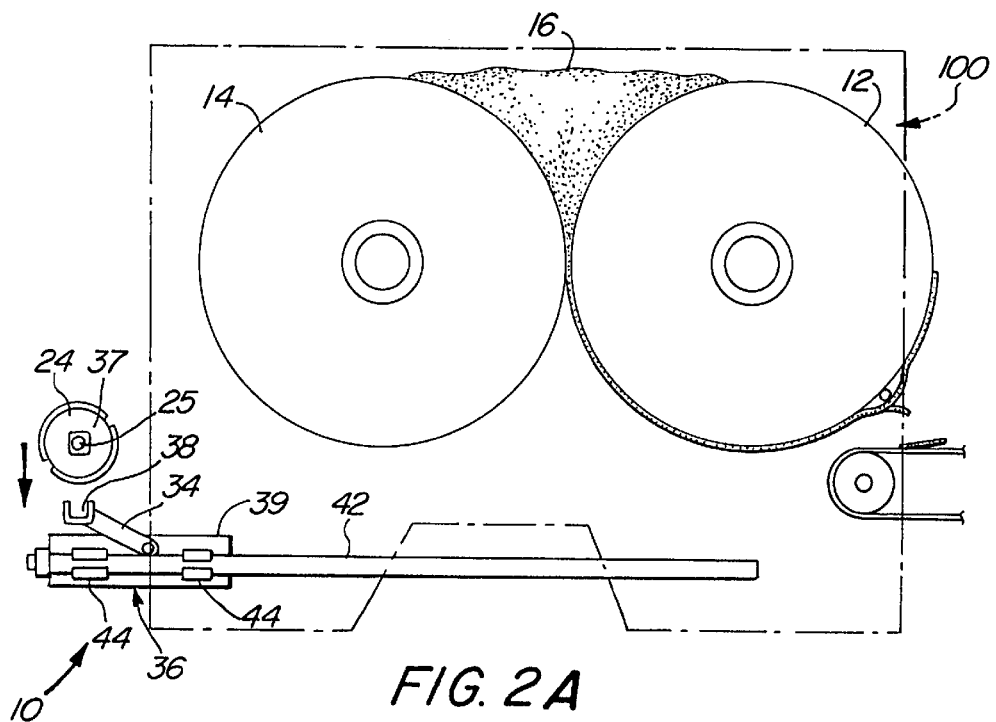
FIGS. 2A to 2D are schematic side views showing the function and general operation of a sheeting head equipped with a rotary cutter handling system according to the present invention.
Figure 2B:
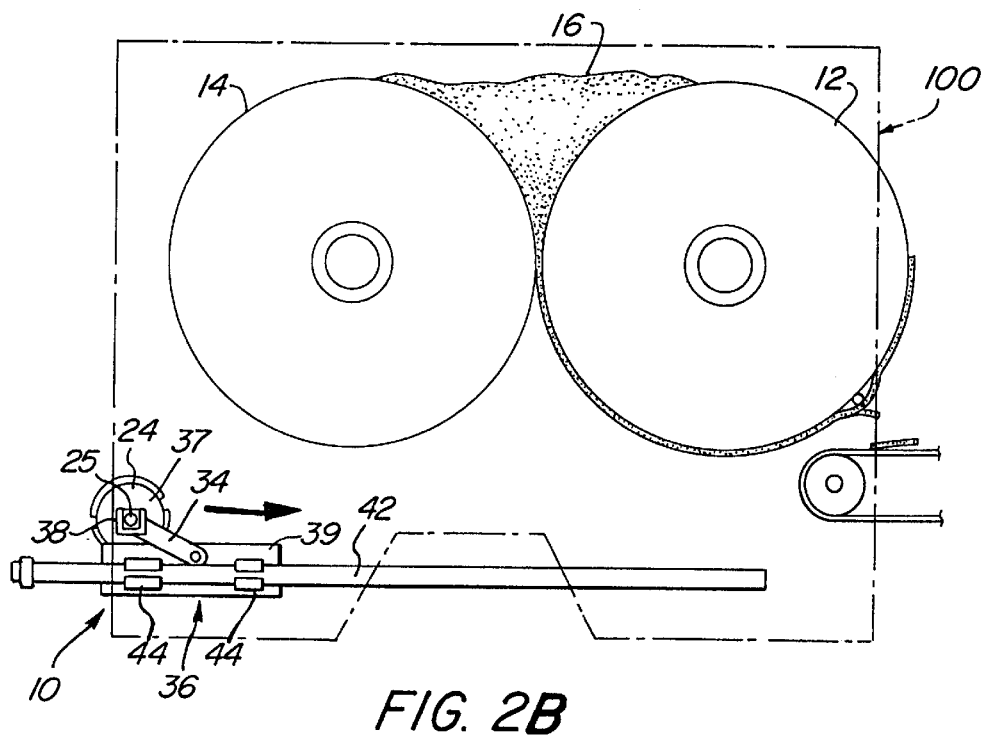
Figure 2C:
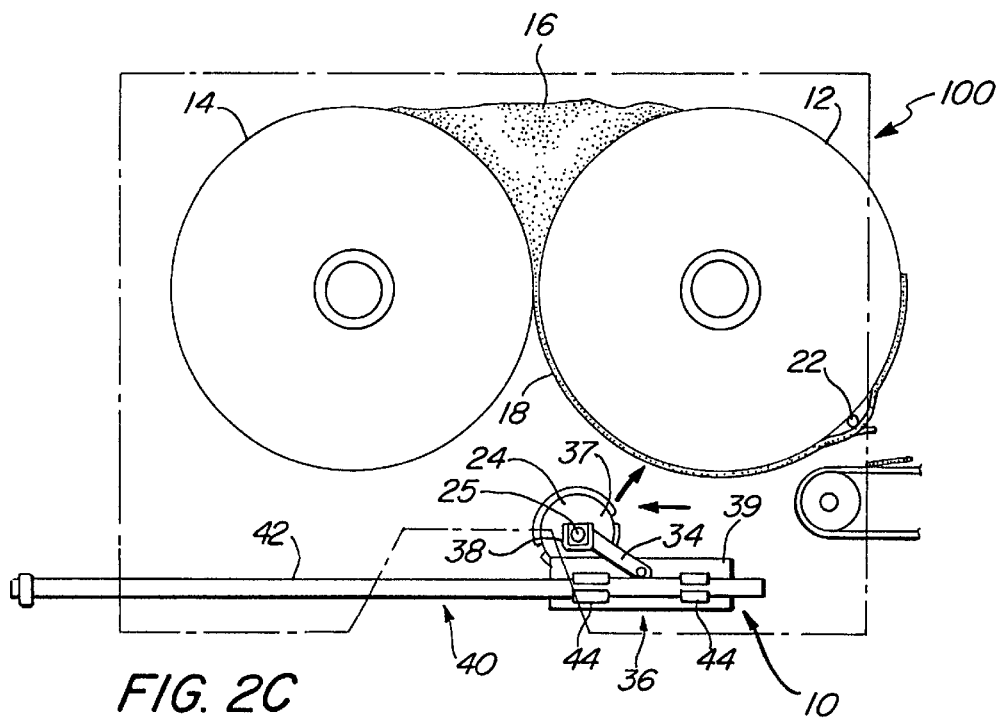
Figure 2D:
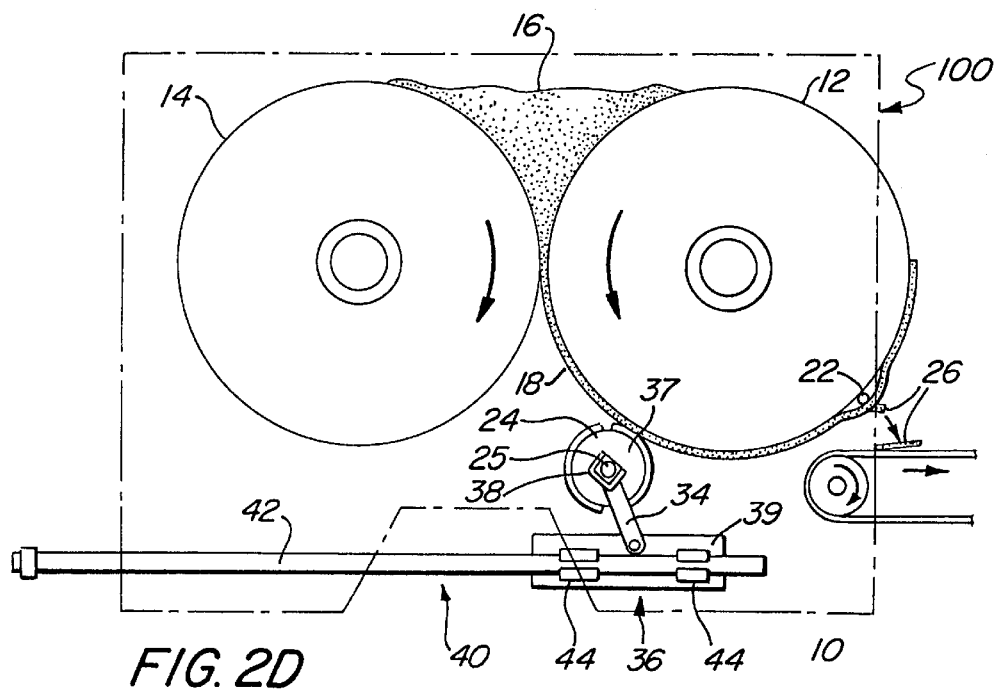

FIGS. 2A to 2D are schematic side views of a sheeting head equipped with a rotary cutter handling system 10 of the present invention. FIGS. 2A to 2D illustrate the operation of the rotary cutter handling system 10 as it moves a rotary cutter 24 between a replacement position (FIG. 2A) and an operating position (FIG. 2D).

As discussed above and specifically shown in FIG. 2D, the rotary cutter 24 must rotate in contact with a front roller 12 so that the rotary cutter 24 contacts and cuts a dough sheet 18 that is carried on the front roller 12. The rotary cutter 24 is a cylindrical roller that has actual cutter patterns machined as raised ridges into its surface. The rotary cutter 24 is frequently machined from UHMW (ultra-high molecular weight plastic, a food grade plastic manufactured by Du Pont) or brass. The rotary cutter 24 rotates on a shaft 25 that is carried by a yoke of a pivoting lever arm 34. Unlike the prior art (FIG. 1) where the lever arm 34 pivots from a fixed position relative to the side plates or frame of the sheeting head, the present invention provides a cutter carriage 36 which carries the lever arm 34 and a means for moving the carriage 36 beneath the rollers between a "cutting" position below the front roller 12 to a "replacement" position near the back of the sheeter 100 adjacent to the back roller 14.

FIGS. 2A to 2D illustrate the insertion of a rotary cutter 24. In FIG. 2A, the cutter carriage 36 is in the "replacement" position so that, as shown, the shaft 25 of the rotary cutter 24 may easily be inserted into the yoke 38 of the lever arm 34 residing in a lowered position. In FIG. 2B, the cutter carriage 36 is being slid toward the front roller 12 below the back roller 14, the lever arm 34 being sufficiently low that the rotary cutter 24 clears the bottom of the back roller 14. In FIG. 2C, the cutter carriage 36 has brought the rotary cutter 24 to its operating position below the front roller. Finally, in FIG. 2D, the lever arm 34 has been raised to bring the rotary cutter 24 against the surface of the front roller 12 so that cut dough pieces 26 may be produced.

The removal of the rotary cutter 24, of course, simply requires a reversal of the process just described with reference to FIGS. 2A to 2D. In other words, the rotary cutter 24 would be lowered on the pivot arm 34 away from the front roller 12, slid on the cutter carriage 36 beneath the back roller 14, and then removed from the yoke 38 of the lever arm 34 from a back side of the sheeting head 100 where the rotary cutter 24 is easily accessible.

Figure 6:
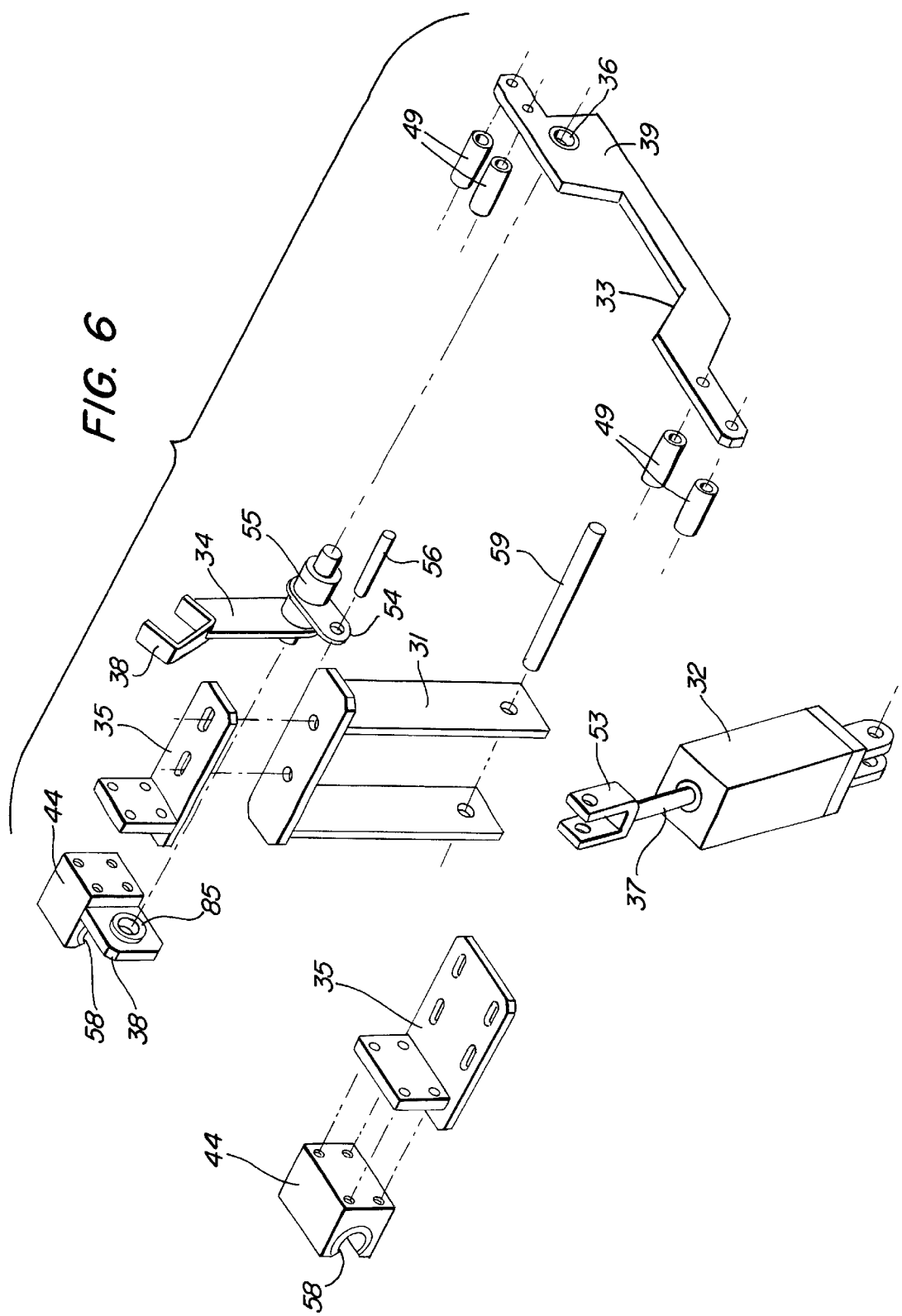
FIG. 6 is an exploded perspective view of one side of the preferred rotary cutter handling system of FIG. 5.

The preferred moving means 40, as suggested by FIGS. 2A–2D, comprises a sliding means 42 that is attached to the sheeting head 100 and cooperative bearing means 44 that is attached to the cutter carriage 36. The preferred sliding means comprises rods 42 that are attached to the side plates 17 of the sheeting head 100 and the preferred bearing means comprises bearing blocks 44 that are attached to side plates 39 of the cutter carriage 36. The preferred rods 42 comprise stainless steel and the preferred bearing blocks 44, as best shown in FIG. 6 discussed below, comprise internal guide shoes 58 made of sintered, oil impregnated bronze which allow the carriage 36 to slide easily along the rods 42. It is possible, of course, to use any variety of drawer-like mechanisms, other than a sliding bearing, such as rollers and rails such as a V-rail and a wheel with a matching periphery.

Figure 3:
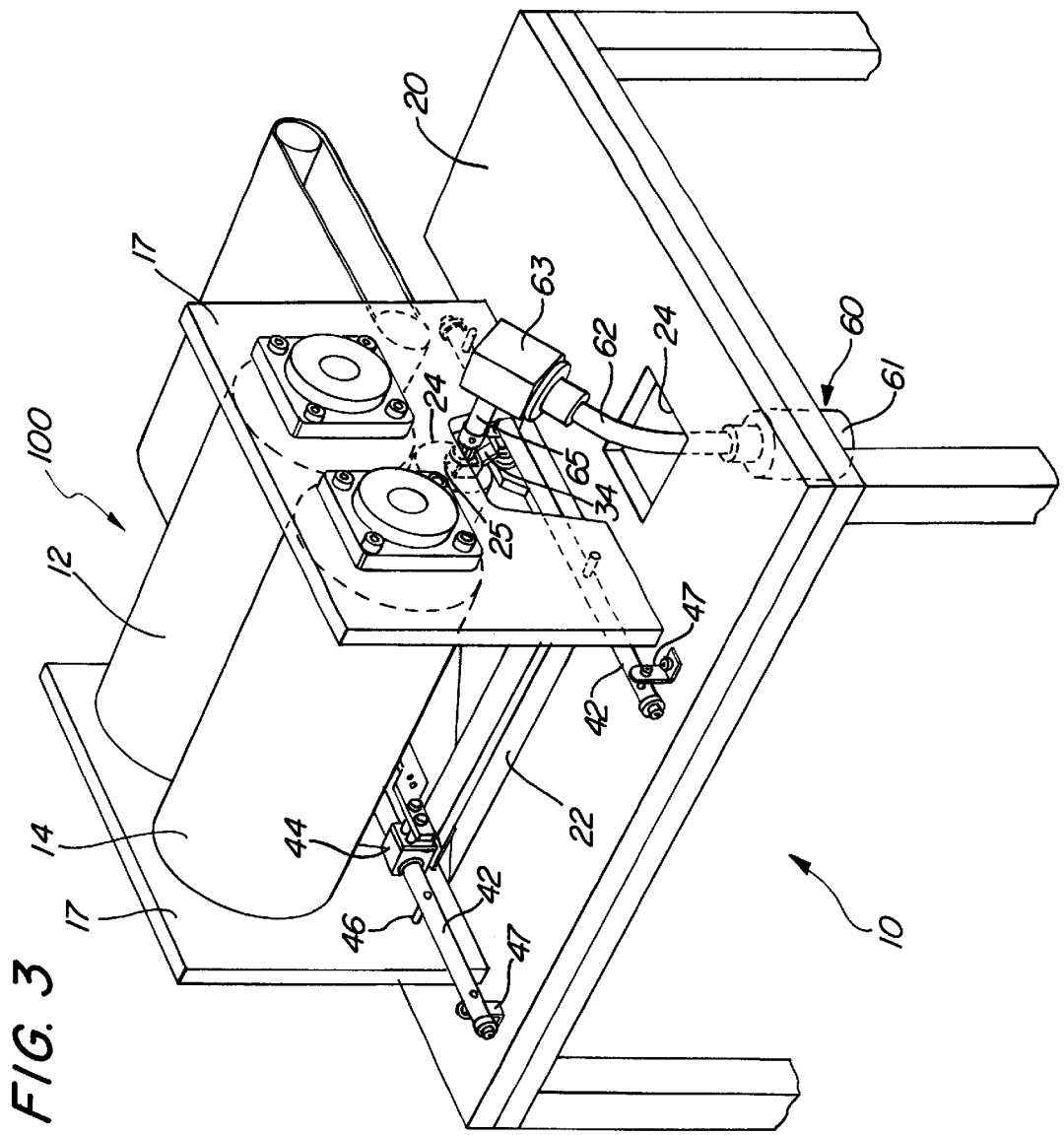
FIG. 3 is a perspective view of the back side of an overall sheeting head equipped with a rotary cutter handling system according to the present invention.

FIG. 3 is a perspective view of a rotary cutter handling system 10 of the present invention in the context of the overall sheeting head supported on a frame 20. This particular frame 20 is provided with an incline 22 sloping downward below a front side of the sheeting head and directs loose particles to a disposal bin. This incline 22 provides clearance for the preferred rotary cutter handling system 10 disclosed herein, but other configurations could be made in the absence of such incline 22.

In FIG. 3, the rotary cutter 24 is in an operating position below the front roller 12. As shown, the rods 42 are preferably attached to the side plates 17 of the sheeting head by spacers 46 and, where the rods 42 extend beyond the side plates 17, to the top of the frame 20 by L-brackets 47. The bearing blocks 44 that slide along the rods 42, one pair of blocks 44 for each rod 42, have a slotted C-shaped design discussed in more detail below so that they can pass unimpeded over the spacers 46.

When the rotary cutter 24 is in contact with the dough sheet 18 on the front roller 12, as shown, the rotary cutter 24 must be driven so that it rotates at substantially the same surface speed as the front roller 12. There are a number of ways of driving the rotary cutter 24 which permits the rotary cutter 24 to be pivoted on the lever arm 34 and carried by the cutter carriage 36 of the present invention. The inventor's preferred means 60 for driving the rotary cutter 24, however, comprises a motor 61 that is driven by an inverter (not shown) and mounted on the frame 20 below the sheeting head, a flexible shaft 62 that rises through and moves within a slot 24 in the top of the frame 20, and a right angle gear box 63 with a rigid, splined drive shaft 65 that releasably engages corresponding splines (not explicitly shown) on the shaft 25 of the rotary cutter 24 via the access port 19 in one of the side plates 17. The flexible shaft 62 permits the rotary cutter to be raised and lowered on the pivot arms 34 and can be easily disengaged from the rotary cutter shaft 25 so that the rotary cutter 24 may be moved to the replacement position.

Other varieties of drive means, however, are certainly possible besides that shown in FIG. 3. One alternative would be a gear fixed concentrically on the cutter shaft 25 that engages a complementary gear connected to the front roller 12, both gears being located inside of the side plates 17. In such case, the two gears would mesh with one another whenever the lever arm 34 brought the rotary cutter 24 into contact with the front roller 12. The cutter shaft 25 could also extend beyond the side plate 17 having the access opening 19 and the gears be located on the outside of the side plate 17, provided of course that the side plate was modified to include a notch to permit the lengthened shaft to move rearward.

Figure 4:
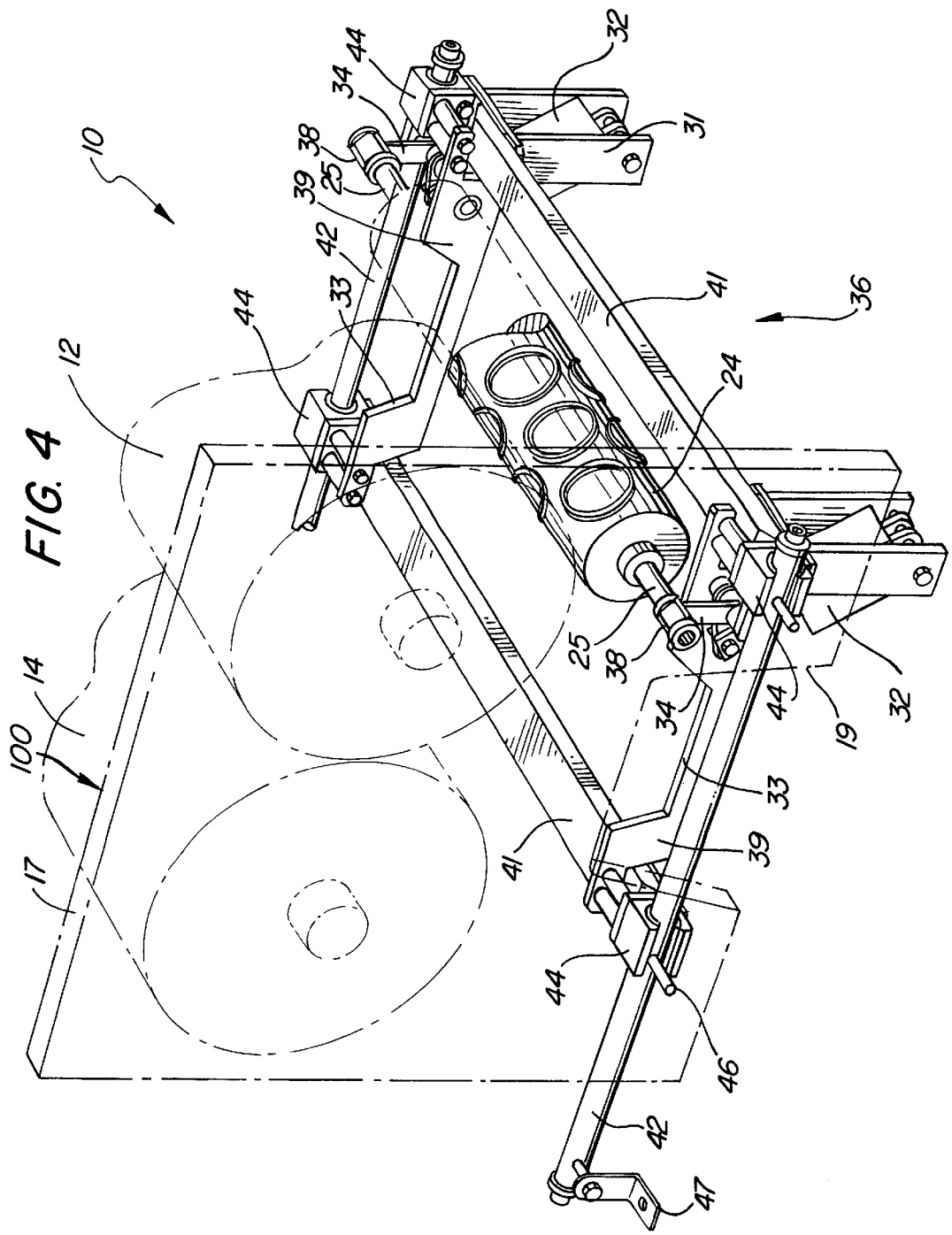
FIG. 4 is a schematic, cut-away, perspective view front a front side of the sheeting head of FIG. 3, with the discharge conveyor belt removed for clarity.

FIG. 4 is a schematic, cut-away, perspective view front a front side of the sheeting head of FIG. 3, with the discharge conveyor belt removed, to more clearly illustrate the construction of the cutter carriage 36 used to implement a preferred rotary cutter handling system 10. As shown, the cutter carriage 36 comprises a pair of side plates 39 that are rigidly connected to one another by a pair of elongated cross-members 41. Each side plate 39 supports a lever arm 34 that carries the rotary cutter 24, a mounting bracket 31 that pivotally supports an air cylinder 32 that operates the lever arm 34, and a pair of bearing blocks 44 which permit the overall cutter carriage 36 to be slid back and forth on the rods 42. The preferred side plate 39 further comprises a cutter notch 33 to receive the cutter 24 and its shaft 25 when the lever arm 34 holds them in a lowered position, but the cutter notch 33 may be unnecessary given different component dimensions. As shown, the preferred bearing blocks 44 have a C-shaped design so that they can pass over the spacers 46 which connect the rods 42 to the side plates 17. Although an air cylinder 32 is shown, it should be readily apparent that other cylinders and solenoids.

Figure 5:
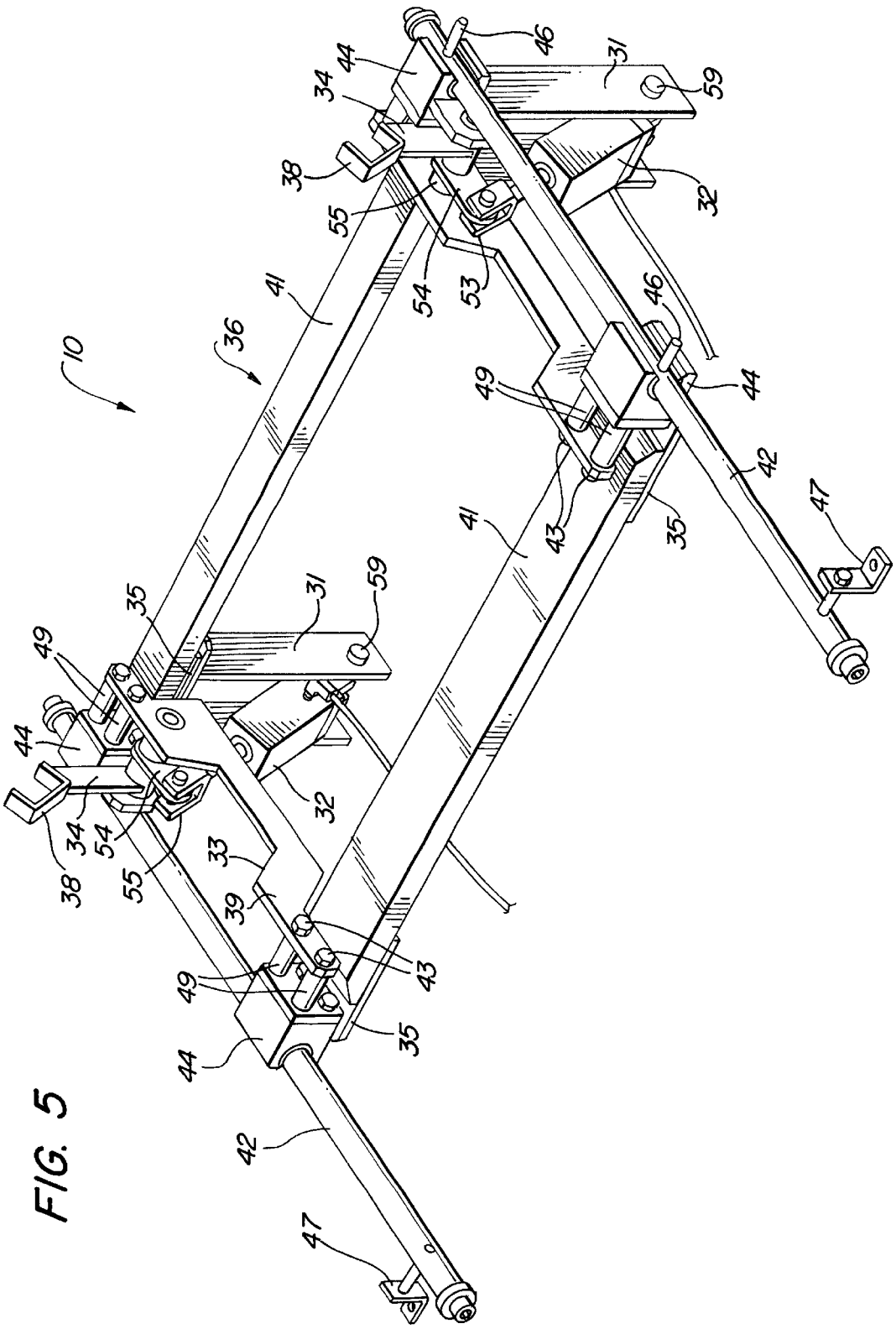
FIG. 5 is a perspective view of the preferred rotary cutter handling system.

FIGS. 5 and 6 best illustrate the detailed construction of the preferred cutter carriage 36, FIG. 5 being an overall perspective view thereof and FIG. 6 being an exploded view of the left side of FIG. 5. As shown, the cutter carriage 36 is slidably supported on the rods 42 by a pair of bearing blocks 44 respectively connected to left and right side plates 39 via hollow spacers 49 and bolts 43. A pair of elongate cross-members 41 span the two side plates 39 and are connected to L-brackets 35 which are connected to the bearing blocks 44 via the same bolts 43 and hollow spacers 49. An air cylinder 32 is pivotally suspended on a pin 59 via a bracket 31 connected to the underside of the L-bracket 35 at the front of each side plate 39. Each air cylinder 32 has a shaft 37 which terminates in a yoke 53 that operates the lever arm 34 via a lever drive arm 54 and a pin 56. The lever drive arm 54 and lever arm 34 are, as best shown in FIG. 6, connected to a common shaft 55, but are offset from one another so that the linear motion of the air cylinder's drive shaft 37 is converted into rotary motion about the shaft 55. The lever arm shaft 55 is rotatably held between a bearing hole 85 in an appendage 83 on the front bearing block 44 and a bearing hole 86 in the side plate 39.

Figure 7:
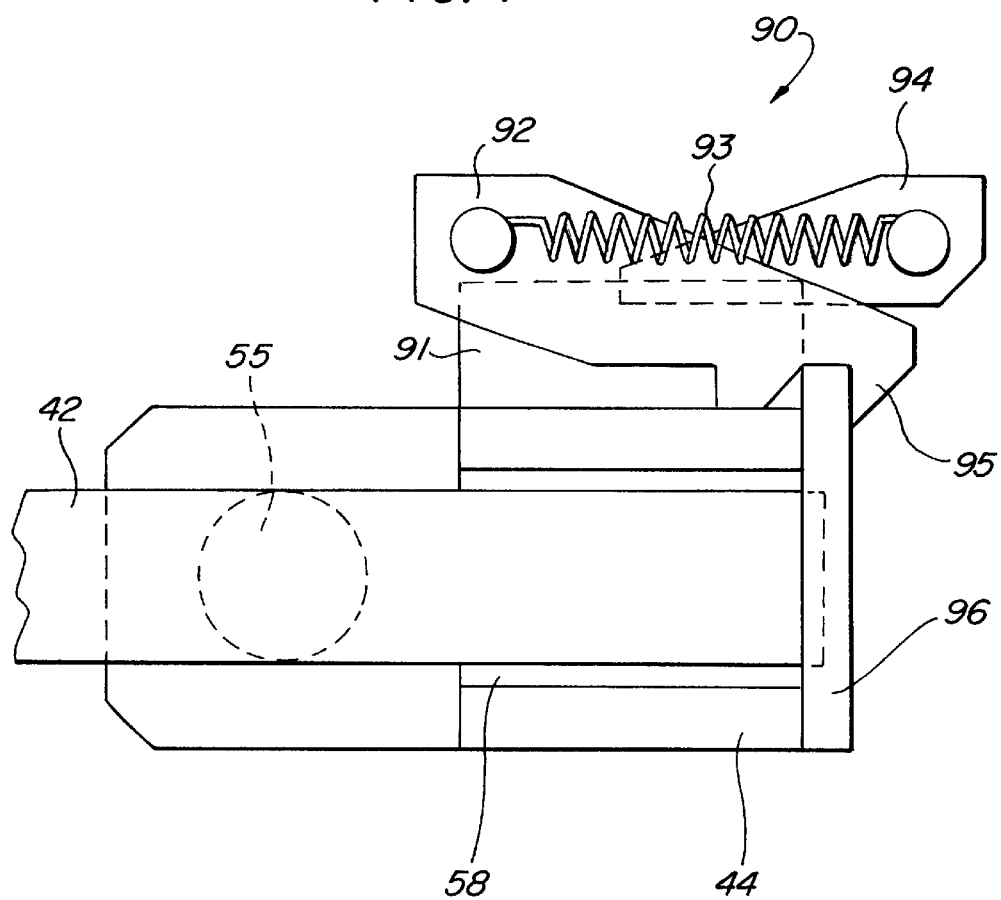
FIG. 7 is a side view of a preferred latch mechanism used to retain the cutter carriage in the operating position shown schematically in FIG. 2D and in more detail in FIG. 5.

FIG. 7 shows a preferred latch mechanism 90 which is designed to be included on the bearing blocks 44 located at a front side of the cutter carriage. The operation of the latch mechanism 90 is best understood with reference to FIG. 5 which could be modified to include such mechanism. Once the cutter carriage 36 has been fully inserted into sheeting head 100 where the rotary cutter 24 will be raised and held against the front roller 12, it is, of course, necessary to maintain the cutter carriage 36 in that position. Although FIG. 5 does not show any latching mechanism for purposes of clarity, FIG. 7 illustrates the preferred latch mechanism 90 which comprises a striker plate 96 and a cooperating pawl 92. The striker plate 96 is simply a rectangular plate secured to the front end of each rod 42 by any appropriate means, such as, a machine screw threaded into the rod 42. The pawl 92 is arranged to pivot upon an upstanding support block 91 secured to the bearing block 44. As suggested by FIG. 7, the pawl 92 pivots about a central point so that an end portion 95 thereof may selectively engage or disengage the striker plate 96. A spring 93 preferably connects an opposite end of the pawl 92 with a spring retention member 94 in order to bias the end portion 95 of the pawl 92 downward. A direct mechanical or power assisted linkage of any variety well known in the art may be used to operate the pawl 92 to selectively engage or to selectively disengage its end portion 95 to the striker plate 96 so that the cutter carriage 36 may be retracted for removal or replacement of the cutter 24. As shown in FIG. 7, the end portion 95 of the pawl 92 is beveled so that the pawl 92 will automatically engage the striker plate when the cutter carriage is inserted forward into the sheeting head 100. Numerous other locking mechanisms are possible, of course, for retaining the cutter carriage 36 in the operating position.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:
1. A sheeting head comprising:
   a back roller and a front roller that counterrotate adjacent one another to form dough into a dough thin sheet on the front roller;
   a rotary cutter that cuts dough sheet food items from the thin dough sheet;
   a cutter carriage located beneath the front and back rollers, the cutter carriage comprising supporting means for selectively raising and lowering the rotary cutter and for removably supporting ends of the rotary cutter; and
   means for moving the cutter carriage between an operating position where the supporting means is located at a front side of the back roller and adjacent to the front roller so that the rotary cutter can be raised by the supporting means to engage the front roller, and a replacement position where the supporting means is located at a back side of the back roller and is sufficiently clear of the back roller so that the rotary cutter can be readily removed from the supporting means of the cutter carriage and lifted away from the back roller.
2. The sheeting head of claim 1 wherein the supporting means of the cutter carriage comprises a lever arm terminating in a yoke and means for pivoting the lever arm about an axis to selectively raise and lower the rotary cutter toward and away from the back roller.

3. The rotary cutter handling apparatus of claim 1 wherein the means for moving the cutter carriage comprises a pair of rods mounted to the sheeting head and a pair of bearing blocks mounted to the cutter carriage.

4. The rotary cutter handling apparatus of claim 1 further comprising a latch mechanism for retaining the cutter carriage in the operating position where the rotary cutter is engageable with the front roller for operating the sheeter head.

5. The sheeting head of claim 1 further comprising means for driving the rotary cutter that may be disengaged therefrom so as not to interfere with the means for moving the cutter carriage.

6. The sheeting head of claim 4 wherein the means for driving the rotary cutter comprises a motor and a flexible shaft.

7. A sheeting head comprising:

a front roller;

a back roller adjacent the front roller;

a rotary cutter carried by a cutter carriage; and sliding means disposed adjacent to ends of the rotary cutter for slidably supporting the cutter carriage between an operating position and a cutter replacement position, the cutter carriage comprising:

two carriage side pieces disposed near either end of the rotary cutter, each in proximity to one of the sliding means;

an elongate cross-member joining the carriage side pieces to form the cutter carriage;

bearing means disposed on each carriage side piece for slidingly carrying each carriage side piece along its proximate sliding means; and attachment means on each carriage side piece for removably attaching one of the ends of the rotary cutter;

whereby the cutter carriage can be slid from the operating position where the rotary cutter is engageable with the front roller to the cutter replacement position where the rotary cutter is free of the rollers and can be readily removed from the attachment means.

8. The rotary cutter handling system of claim 7, wherein the sliding means comprise rods connected to inner surfaces of the frame, and the bearing means comprise bearings formed to partially enclose the rods so that the bearing means can be moved slidingly along the rods while carrying the cutter carriage.

9. The rotary cutter handling system of claim 8, wherein the rods are connected to the frame by spacers and the bearings have openings through which the spacers pass when the bearings are moved slidingly along the rods.

10. The rotary cutter handling system of claim 7, wherein each of the attachment means comprises a lever arm pivotally attached to each of the carriage side pieces, the lever arm having means for removably grasping one end of the rotary cutter.

11. The rotary cutter handling system of claim 10 further comprising movement means for moving the lever arm from a first position where the grasped rotary cutter does not engage the front roller to a second position where the grasped rotary cutter engages the front roller.

12. The rotary cutter handling system of claim 11, wherein the movement means comprises an air cylinder.

13. The sheeting head of claim 7 further comprising means for driving the rotary cutter that may be disengaged therefrom so as not to interfere with the cutter carriage.

14. The sheeting head of claim 13 wherein the means for driving the rotary cutter comprises a motor and a flexible shaft.

15. The sheeting head of claim 14 further comprising a splined connection between a shaft of the rotary cutter and the flexible shaft.

* * * * *